(12) United States Patent
Quinno et al.

(10) Patent No.: US 6,234,570 B1
(45) Date of Patent: May 22, 2001

(54) INTEGRATION OF SUNGLASS STORAGE HOLDER WITH PULL HANDLE ASSEMBLY

(75) Inventors: James L. Quinno, Saline, MI (US); Kimberly C. Leshan, Boise, ID (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/523,488

(22) Filed: Mar. 10, 2000

Related U.S. Application Data

(60) Provisional application No. 60/123,612, filed on Mar. 10, 1999.

(51) Int. Cl.[7] .................................................. B60J 7/00
(52) U.S. Cl. ........................ 296/214; 296/37.7; 296/37.8
(58) Field of Search ................................. 296/37.7, 37.8, 296/214

(56) References Cited

U.S. PATENT DOCUMENTS

| | | | |
|---|---|---|---|
| 4,469,365 | * 9/1984 | Marcus et al. | 296/37.7 |
| 4,867,498 | * 9/1989 | Delphia et al. | 296/37.7 |
| 4,893,867 | * 1/1990 | Hilborn et al | 296/37.7 |
| 4,902,068 | * 2/1990 | Dowd et al. | 296/37.7 |
| 5,050,922 | * 9/1991 | Falcoff | 296/37.7 |
| 5,303,970 | * 4/1994 | Young et al. | 296/37.7 |
| 5,403,064 | * 4/1995 | Mahler et al. | 296/214 |
| 5,519,917 | * 5/1996 | Cordonnier | 296/214 |
| 5,920,957 | * 7/1999 | Wagner | 296/214 |
| 5,975,606 | * 11/1999 | Forbes et al. | 296/214 |
| 6,062,623 | * 5/2000 | Lemmen | 296/37.8 |
| 6,106,055 | * 8/2000 | Fischer | 296/214 |
| 6,135,528 | * 10/2000 | Sobieski et al. | 296/37.8 |

* cited by examiner

Primary Examiner—D. Glenn Dayoan
Assistant Examiner—Kiran B. Patel
(74) Attorney, Agent, or Firm—Brooks & Kushman P.C.

(57) ABSTRACT

A vehicle pull handle assembly includes a housing adapted for mounting in a vehicle and a pull handle connected to the housing. A storage bin is pivotally connected to the housing and configured to receive a pair of sunglasses. The pull handle and storage bin are positioned longitudinally in end-to-end or side-by-side relationships with respect to each other.

5 Claims, 5 Drawing Sheets

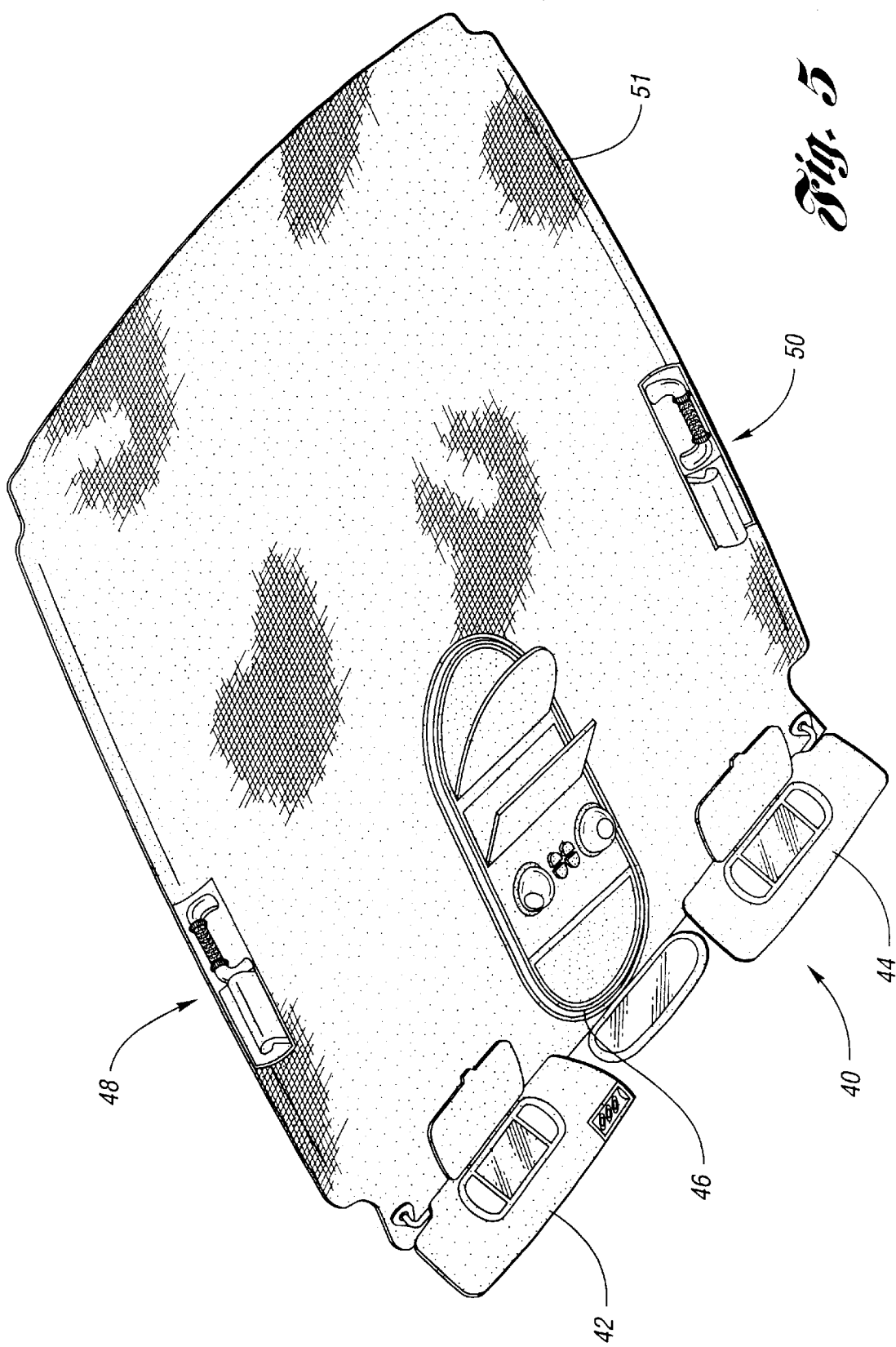

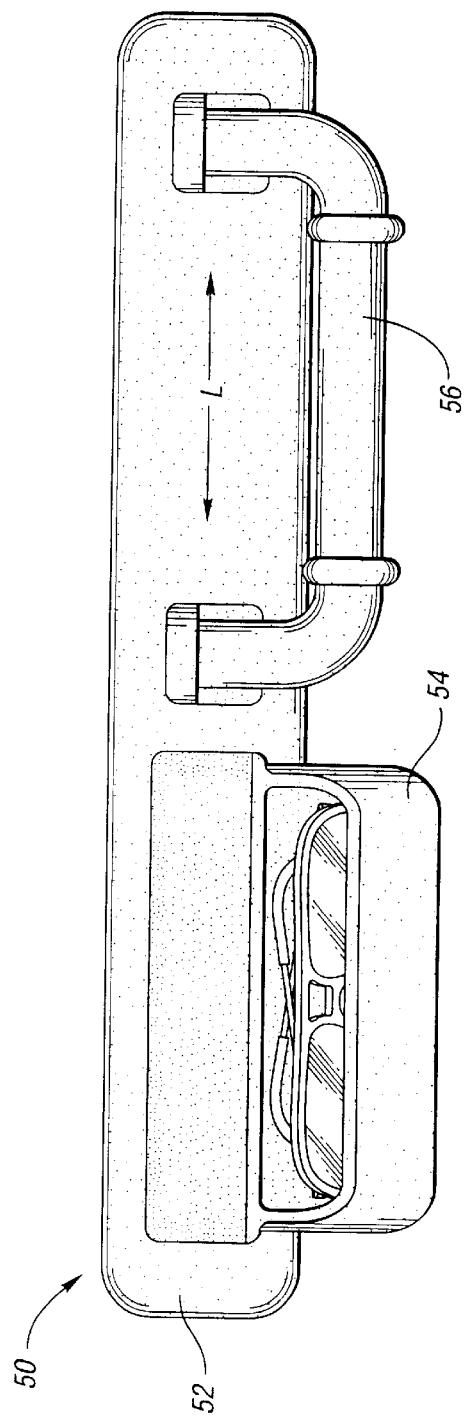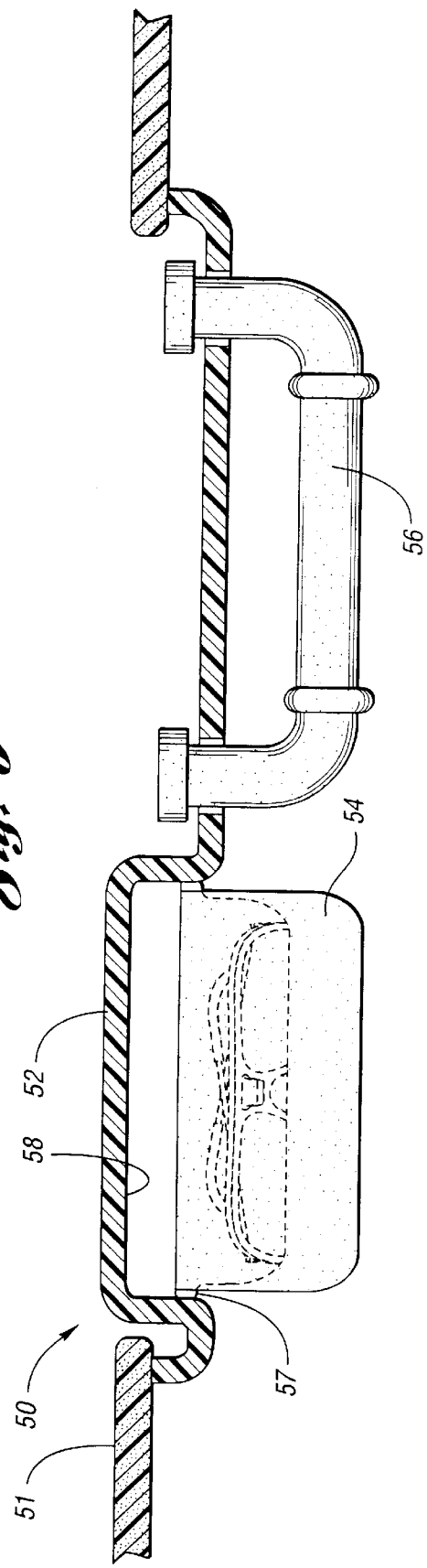

INTEGRATION OF SUNGLASS STORAGE HOLDER WITH PULL HANDLE ASSEMBLY

CROSS-REFERENCE TO RELATED APPLICATION

This application claims priority to U.S. provisional application Ser. No. 60/123,612, filed Mar. 10, 1999.

TECHNICAL FIELD

The present invention relates to a vehicle pull handle assembly incorporating a storage bin configured to receive a pair of sunglasses.

BACKGROUND ART

Some modern vehicle designs include a storage bin for sunglasses on an overhead console. This can be problematic because the storage bin consumes substantial space on the overhead console which can be use for mounting other components. Sunglass storage bins may also be mounted within floor consoles or glove compartments in vehicles. Again, by providing storage bins in these locations, valuable storage space may be compromised. Also, these locations are typically only accessible to a vehicle driver or passenger.

It is desirable to provide sunglass storage in alternative locations in the vehicle which does not compromise usable space in the floor console or instrument panel.

DISCLOSURE OF INVENTION

The present invention overcomes the above referenced shortcomings of prior art vehicle sunglass storage bins by integrating a sunglass storage bin with a pull handle assembly. In this manner, the sunglass storage bin does not interfere with any usable space on the center console, floor console or glove box.

More specifically, the present invention provides a vehicle pull handle assembly including a housing adapted for mounting in a vehicle. A pull handle is connected to the housing. A storage bin is pivotally connected to the housing. The storage bin is configured to receive a pair of sunglasses. By mounting the storage bin on a pull handle assembly, personal sunglass storage may be provided for each individual seat occupant.

Accordingly, an object of the invention is to provide an improved sunglass storage bin for a vehicle which does not interfere with usable storage space in the vehicle, and which provides readily accessible sunglass storage for individual seat occupants.

Another object of this invention is to provide a sunglass storage bin integrally mounted with a pull handle assembly for installation therewith in the vehicle.

The above objects and other objects, features and advantages of the present invention are readily apparent from the following detailed description of the best mode for carrying out the invention when taken in connection with the accompanying drawings.

BRIEF DESCRIPTION OF DRAWINGS

FIG. 5 shows a perspective view of a vehicle headliner assembly in accordance with an alternative embodiment of the invention;

FIG. 6 shows a side view of a pull handle assembly in accordance with the embodiment of FIG. 5; and FIG. 7 shows a longitudinal cross-sectional view of a pull handle assembly in accordance with the embodiment of FIG. 5.

BEST MODE FOR CARRYING OUT THE INVENTION

Figure 1:
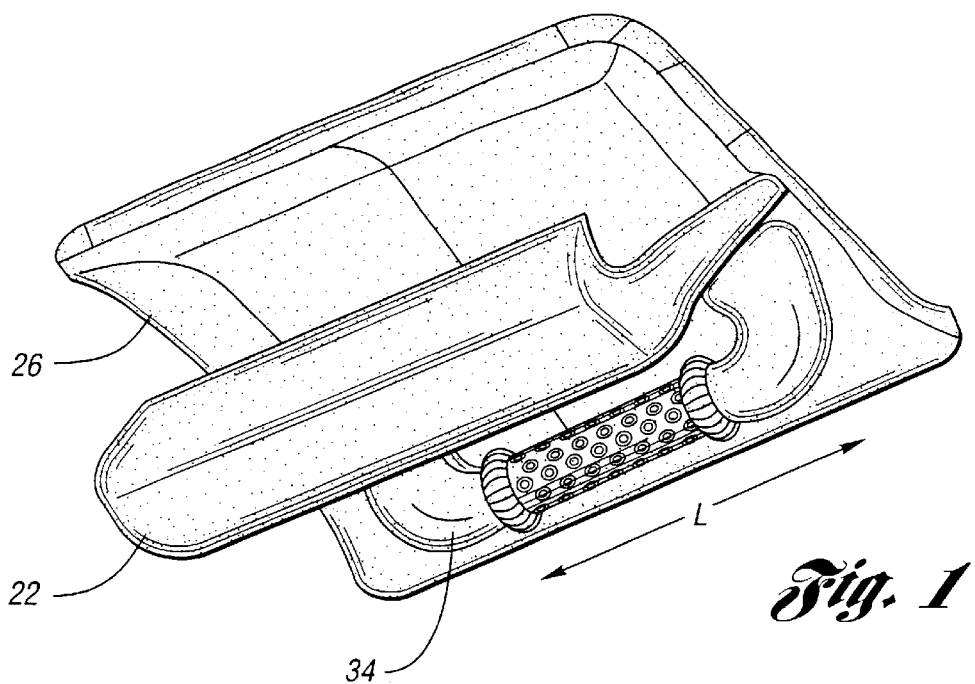
FIG. 1 shows a perspective view of a vehicle pull handle assembly in accordance with the present invention.

Referring to FIGS. 1–4, a first embodiment of the invention is shown. A vehicle headliner assembly 10, shown in FIG. 3, includes sun visors, 12,14, overhead console 15, grab handle 16, and a pull handle assembly 18 mounted to the headliner 20. The pull handle assembly 18 is configured to include a sunglass storage bin 22 in accordance with the present invention.

Figure 2:
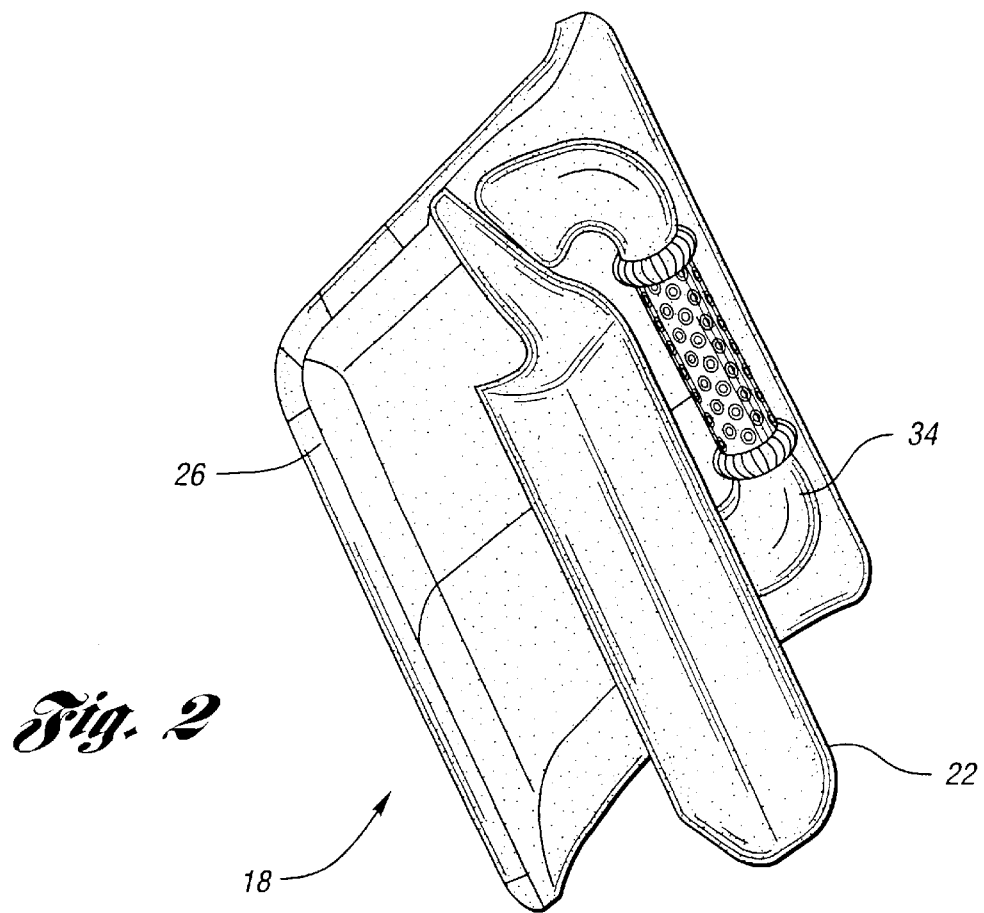
FIG. 2 shows a reverse perspective view of the vehicle pull handle assembly of FIG. 1.
Figure 3:
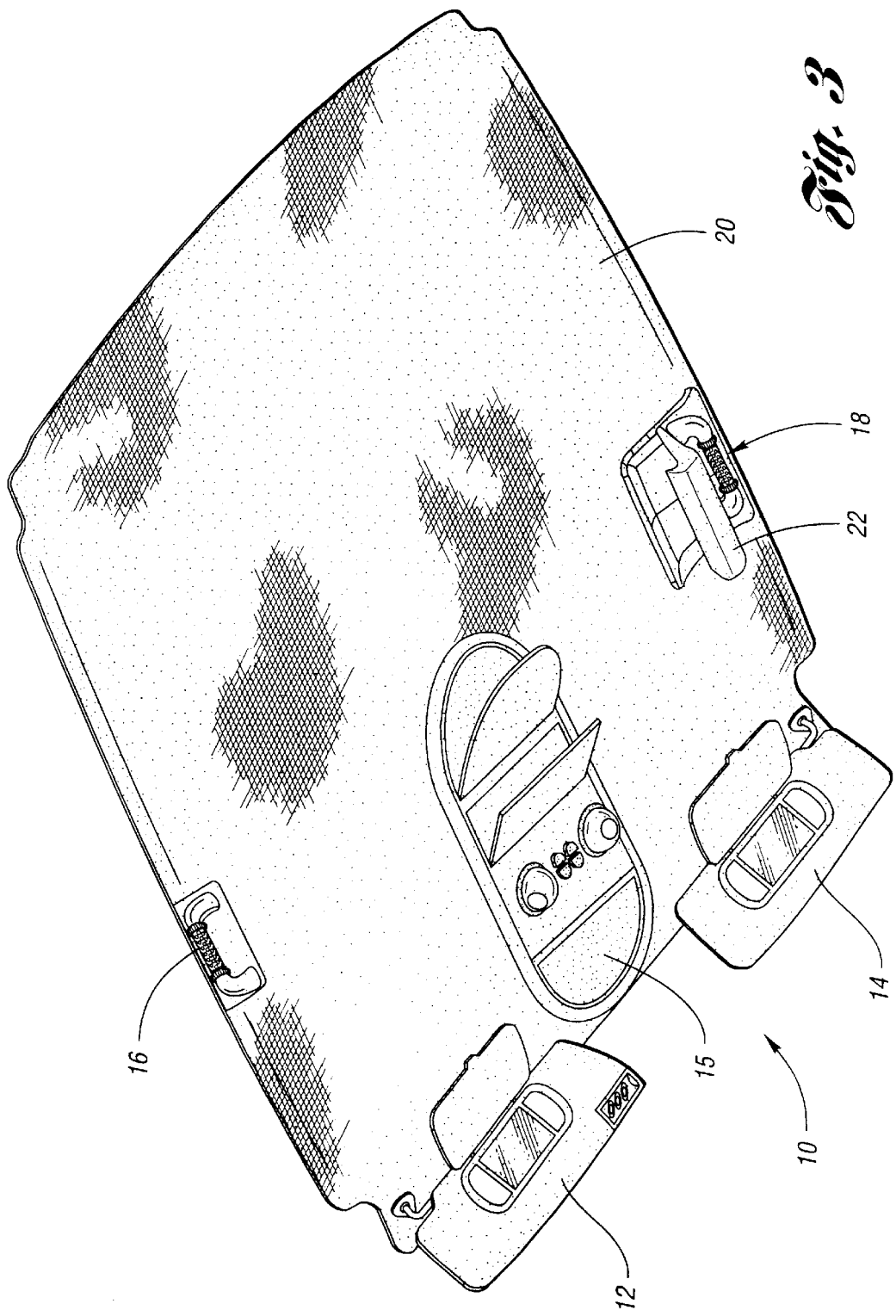
FIG. 3 shows a perspective view of a vehicle headliner assembly in accordance with the present invention.
Figure 4:
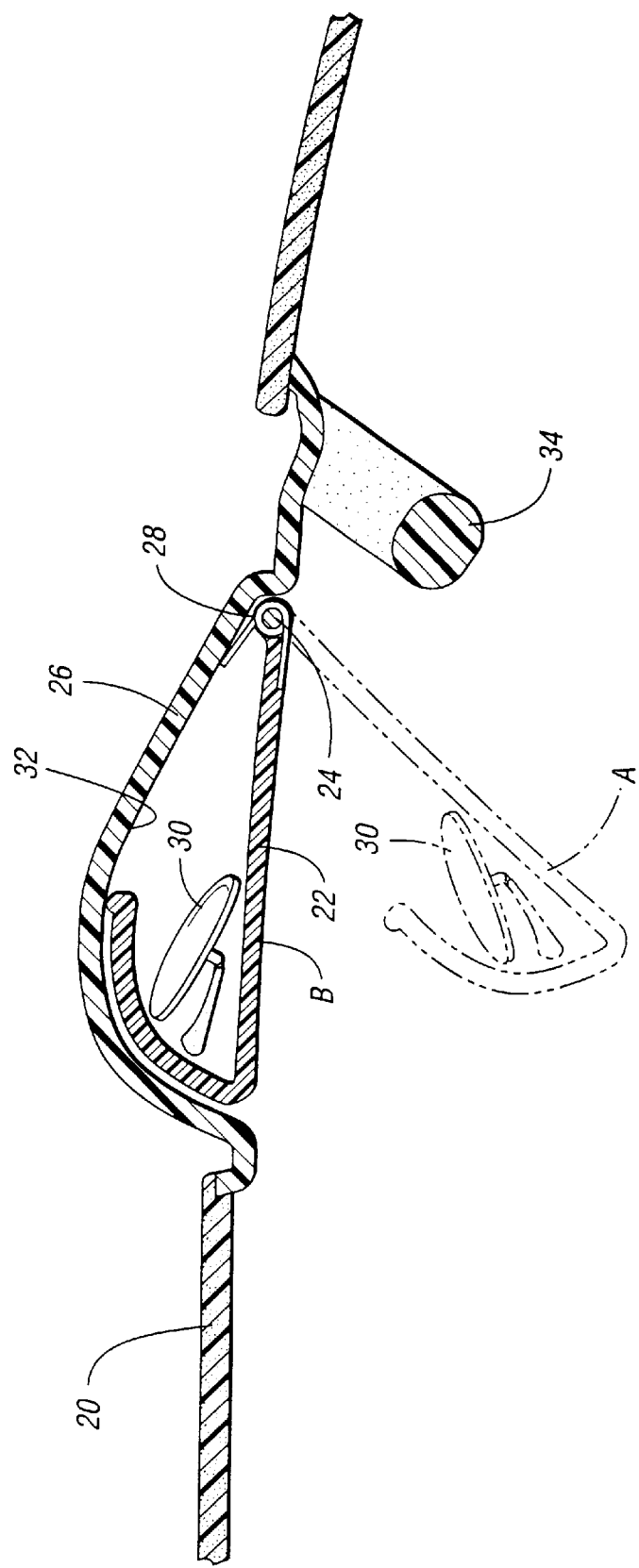
FIG. 4 shows a schematically arranged lateral cross-sectional view of the pull handle assembly of FIG. 1, showing the storage bin in open and closed positions.

The pull handle assembly 18 is more clearly shown in FIGS. 1, 2, and 4. The pull handle assembly 18 includes the sunglass storage bin 22 which is pivotally mounted about the pivot joint 24 to the housing 26, which is a single plastic injected molded component. FIG. 4 shows the storage bin 22 in open and closed positions. As illustrated in FIG. 4, the sunglass storage bin 22 is pivotable between the open position "A" for access to the sunglasses, and the closed position "B" for storage. Preferably, the sunglass storage bin 22 includes a rotary spring 28 pivotally biasing the housing 26 toward the closed position "B" about the pivot axis 24.

In this manner, the sunglasses 30 may be stored within the recess 32 of the housing 26. A pull handle 34 is also mounted to the housing 26, and may also include a rotary spring for retractability. The housing 26, sunglass storage bin 22 and pull handle 34 are all mounted as in integral subassembly to the headliner 20 during the assembly process.

As shown in FIG. 1, the pull handle 34 and storage bin 22 are positioned longitudinally side-by-side with respect to each other on the housing 26 along a longitudinal axis L of the assembly 18. In other words, the pivot axis of the storage bin 22 is parallel to and spaced away from the longitudinal axis of the pull handle 34, and the storage bin 22 and pull handle 34 are located at the same fore/aft position on the headliner 20.

In an alternative embodiment shown in FIGS. 5–7, the pull handle and sunglass storage bin are arranged longitudinally end-to-end with respect to each other, as described below. Referring to FIG. 5, the alternative headliner assembly 40 includes sunvisors 42,44, an overhead console assembly 46, and pull handle assemblies 48,50 in accordance with the present invention. As shown in FIGS. 6 and 7, the pull handle assembly 50 includes a housing 52 with a sunglass storage bin 54 and pull handle 56 mounted to the housing 52. The sunglass storage bin 54 and pull handle 56 are mounted longitudinally end-to-end with respect to a longitudinal axis L of the assembly 50.

As shown in FIG. 7, the sunglass storage bin 54 is pivotally mounted along a pivot joint 57 for pivotal movement of the storage sunglass storage bin 54 with respect to a recess 58 formed in the housing 52. As shown, the housing 52 is connected to the headliner 51 by conventional means to complete the assembly.

While embodiments of the invention have been illustrated and described, it is not intended that these embodiments illustrate and describe all possible forms of the invention. Rather, the words used in the specification are words of description rather than limtation, and it is understood that various changes may be made without departing from the spirit and scope of the invention.

What is claimed is:

1. A vehicle headliner assembly attachable to a vehicle roof comprising:

a headliner;

a housing mounted to the headliner;

a pull handle directly connected to the housing;

a storage bin directly pivotally connected to the housing adjacent the pull handle, whereby said housing, pull handle and storage bin form a subassembly which is attached to the headliner, said storage bin configured to receive a pair of sunglasses; and wherein, in a final assembly in which the headliner, housing, pull handle and storage bin are attached to the vehicle roof, the pull handle is non-movably mounted to the roof and configured to support an occupant's weight during ingress and egress.

2. The vehicle pull handle assembly of claim 1, wherein said pull handle and storage bin are positioned longitudinally end-to-end with respect to each other on the housing.

3. The vehicle pull handle assembly of claim 1, wherein said pull handle and storage bin are positioned longitudinally side-by-side with respect to each other on the housing.

4. The vehicle pull handle assembly of claim 1, wherein said housing comprises a single injection molded plastic component.

5. The vehicle pull handle assembly of claim 1, wherein said pull handle is retractable.

* * * * *